United States Patent [19]

Choisnet

[11] Patent Number: 4,972,725
[45] Date of Patent: Nov. 27, 1990

[54] TORSION ANGLE CAPACITIVE SENSOR AND TORQUE MEASURING

[75] Inventor: Joel Choisnet, La Frette/Seine, France

[73] Assignee: Thomson-CSF, Puteaux, France

[21] Appl. No.: 384,127

[22] Filed: Jul. 24, 1989

[30] Foreign Application Priority Data

Jul. 26, 1988 [FR] France .................. 8810046

[51] Int. Cl.$^5$ .............................................. G01L 3/02
[52] U.S. Cl. .................................................. 73/862.33
[58] Field of Search ............................. 73/116, 862.33

[56] References Cited

U.S. PATENT DOCUMENTS 2,476,410 7/1949 Gardiner ...................... 73/862.33
3,906,787 9/1975 Wingbermuhle .............. 73/862.33

FOREIGN PATENT DOCUMENTS 108894 5/1984 European Pat. Off. .

Primary Examiner—Jerry W. Myracle
Attorney, Agent, or Firm—Oblon, Spivak, McClelland, Maier & Neustadt

[57] ABSTRACT

The disclosed sensor has a sleeve which forms a section of an engine shaft. Pairs of plane electrodes, parallel to the axis of the shaft, are arranged in the sleeve. The two electrodes of one and the same pair are respectivley soldily joined to the ends of the sleeve, and form a capacitor the inter-electrode space of which varies when an engine torque causes a torsion of the sleeve. The variations in the capacitances of the capacitors are measured by an electronic circuit borne by a plane internal to the sleeve of the sensor. A rotating transformer provides for the supply to the electronic circuit and the transfer of output signals from this circuit to an operating device external the sensor. The disclosed device can be applied to the measurement of torque transmitted bya helicopter engine shaft.

9 Claims, 3 Drawing Sheets

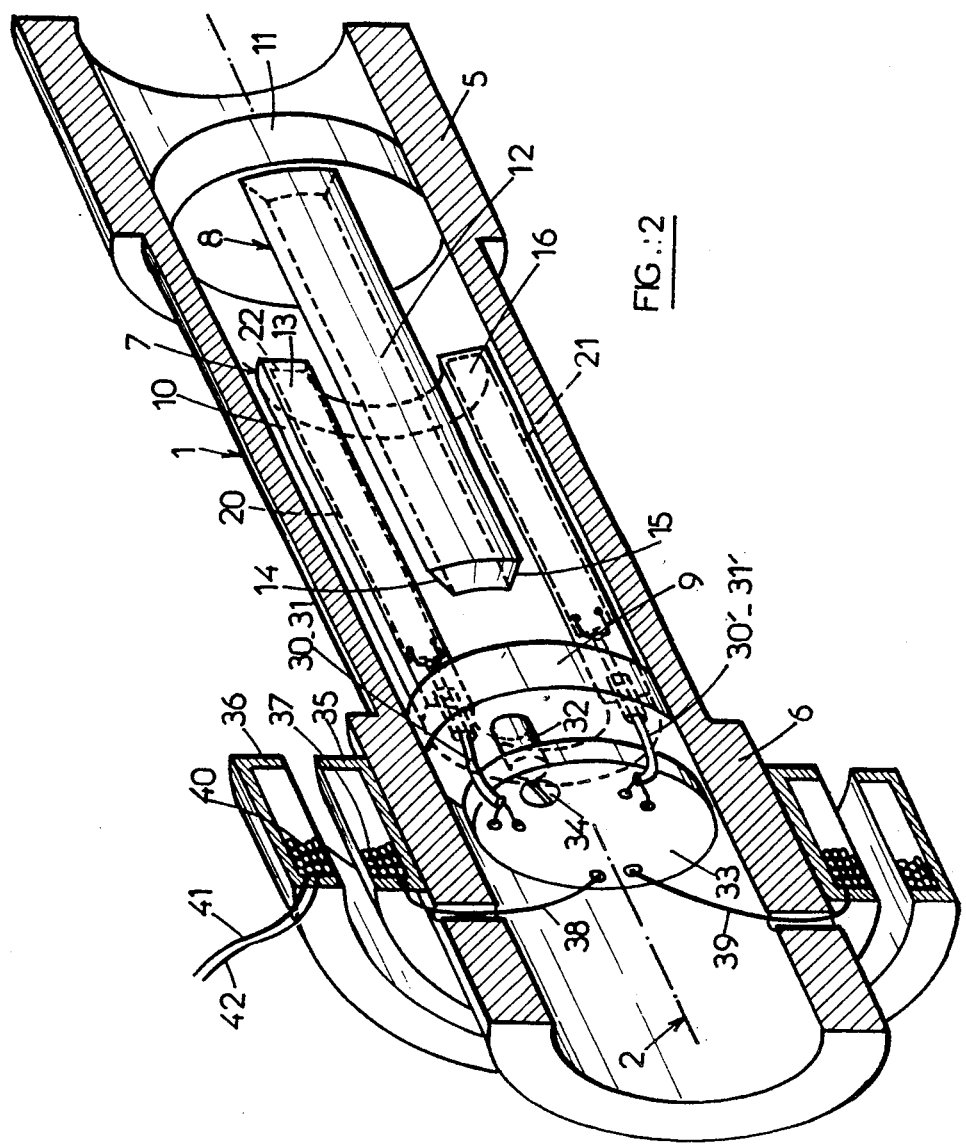
FIG.:2

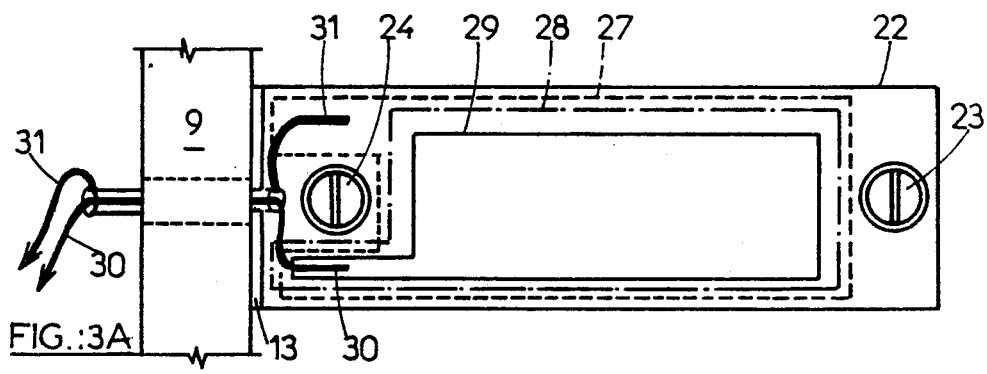
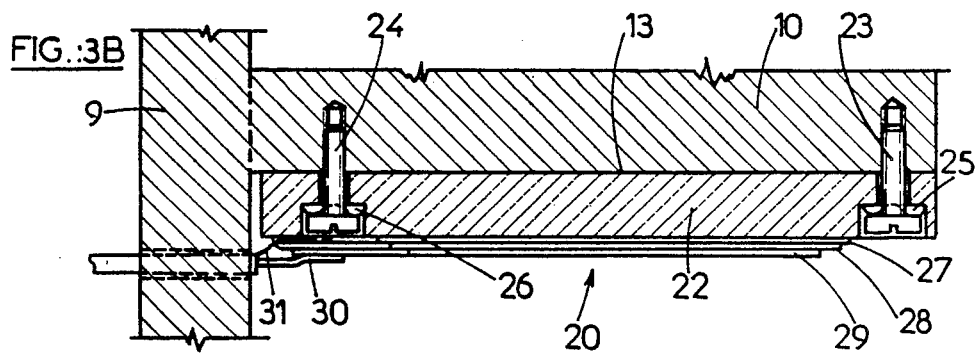
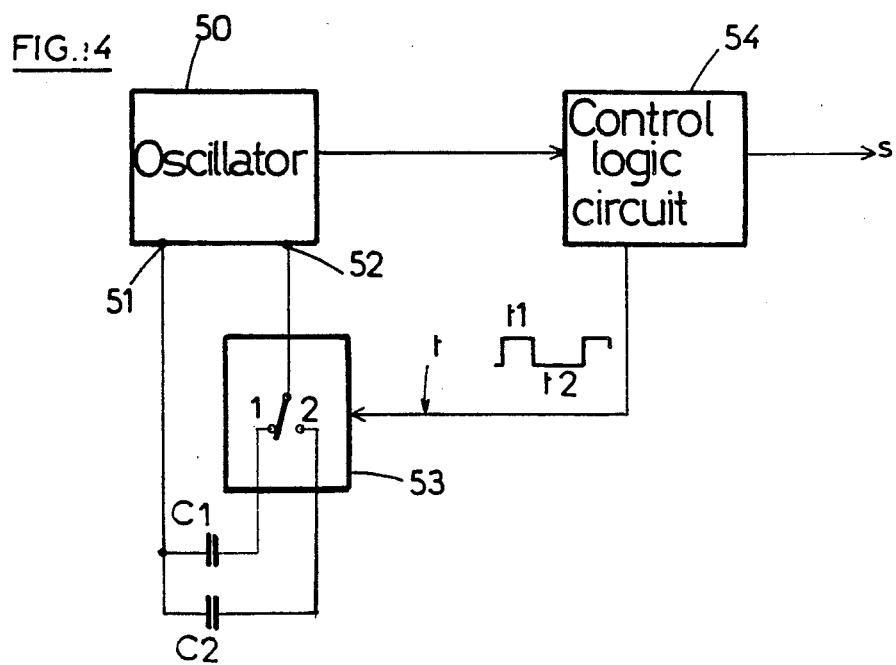

TORSION ANGLE CAPACITIVE SENSOR AND TORQUE MEASURING

BACKGROUND OF THE INVENTION

1. Field of the Invention

The present invention pertains to a capacitive sensor of a torsion angle and to a torque or moment measuring instrument provided with a sensor such as this. More particularly, the present invention pertains to a sensor such as this and an instrument such as this designed to provide for constant monitoring of a torque transmitted by an engine shaft, of which the sensor is an integral part.

2. Description of the Prior Art

The measurement of the torque transmitted by an engine shaft can be used to determine the mechanical power transmitted by this shaft when its rotational speed is known. Many instruments have been designed to measure torque. These instruments use a very wide variety of sensors such as piezo-electrical sensors, magnetostrictive sensors, inductive sensors, optical sensors, magnetic sensors, wire strain gauge sensors, capacitive sensors etc.

For example, there is a torsional torque or moment detector comprising a tube in which there is a capacitor plate fixed to one of the two ends of the tube. This tube further contains at least one second supporting plate fixed to other one of the two ends of the tube, parallel to the capacitor plate. This supporting plate bears, on its side pointed towards the capacitor plate and on either side of the median line extending parallel to the axis of the torsion tube, two conductive coatings forming capacitor electrodes. The sensor is built into a clamping torque limiter screwdriver. In this application, the torsion tube is fixed to a pneumatic motor which is itself fixed to the casing of the screwdriver. Because of this fixedness, the electric connection of the electrodes to an external device or the measurement of the capacitances of these capacitors raises no particular difficulty and works simply by means of electrical conductors which go through a base of the detector. However, this detector is not adapted for incorporation in a rotating shaft, especially because of its dimensions.

The different prior art measuring sensors prove to be ill-suited to the measurement of torque values developed by engines used, for example, in aeronautics, such as helicopter engines. For, these sensors poorly withstand difficult environmental conditions:
engine shaft located on a housing filled with oil for the cooling and lubrication of the engine;
high temperature and vibration levels;
high rotation speed.

Apart from the difficult environmental conditions, difficulties also arise from the fact that there is limited space to install a torque sensor and that high precision of measurements is required. For, the torque delivered by a helicopter engine is an essential piloting parameter. The monitoring of the development in time of the torque given by the engine gives an indication of its ageing and makes it possible to start maintenance operations and, in the case of two-engine helicopters, it is necessary to balance the torque delivered by the two engines.

At present, for this application, when the measuring instrument uses a toothed wheel type magnetic proximity sensor, the precision of the measurement remains restricted because, firstly, the signals given by the magnetic sensor have little relative variation with the torque transmitted and, secondly, depend on variations of the gap between the toothed wheel and the sensor and the rotation speed of the shaft.

With a torque measuring instrument using a sensor sensitive to the pressure of a hydraulic circuit, the torque of which modulates the section of a leakage hole, the precision is restricted by that of the pressure sensor and by the fabrication quality of the associated hydraulic circuit.

With a measuring instrument using wire strain gauges, there appear the usual drawbacks of strain gauge bridges which deliver low level signals which are difficult to compensate for in terms of temperature.

SUMMARY OF THE INVENTION

An aim of the present invention is to make a sensor for the measurement of a torque transmitted by an engine shaft which prevents or at least reduces the drawbacks or inadequacies mentioned above.

According to the present invention, there is provided a torsion angle capacitive sensor for the measurement of a torque transmitted by an engine shaft having an axis, which comprises a sleeve which forms a section of the engine shaft and has two ends and two pairs of electrodes, the two electrodes of one and the same pair being respectively solidly joined to the two ends of the sleeve and extending in parallel to the axis of the engine to form two capacitors, the capacitors of each of the two capacitors varying immensely when a torsional movement or torque is applied between ends of the sleeve, electronic means connected to the two capacitors and sensitive to the capacitance of each of these capacitors, electromagnetic interface means having a first part solidly joined to the sleeve and a second part solidly joined to a frame in which there rotates the engine shaft to transmit the signal to an external operating device of the sensor and a first supporting element shaped like a cylindrical shell, coaxial with the sleeve and solidly joined to one end of the sleeve, the shell having an axial slit, the edges of which define two of the electrodes, a second supporting element solidly joined to another end of the sleeve and bearing two of the other electrodes each extending in the sleeve so as to face one of the electrodes defined on the cylindrical shell to form the capacitors.

BRIEF DESCRIPTION OF THE DRAWINGS

The present invention will be better understood from the description and the figures.

FIG. 2 shows a schematic view in perspective of a second embodiment of a capacitive sensor according to the present invention;

FIGS. 3A and 3B show a sectional view and a view in elevation, respectively, of an embodiment of a capacitor electrode of a sensor according to the invention;

FIG. 4 shows a schematic view of an electronic processing device built into a torque measuring instrument provided with a sensor according to the present invention.

MORE DETAILED DESCRIPTION

Figure 1:
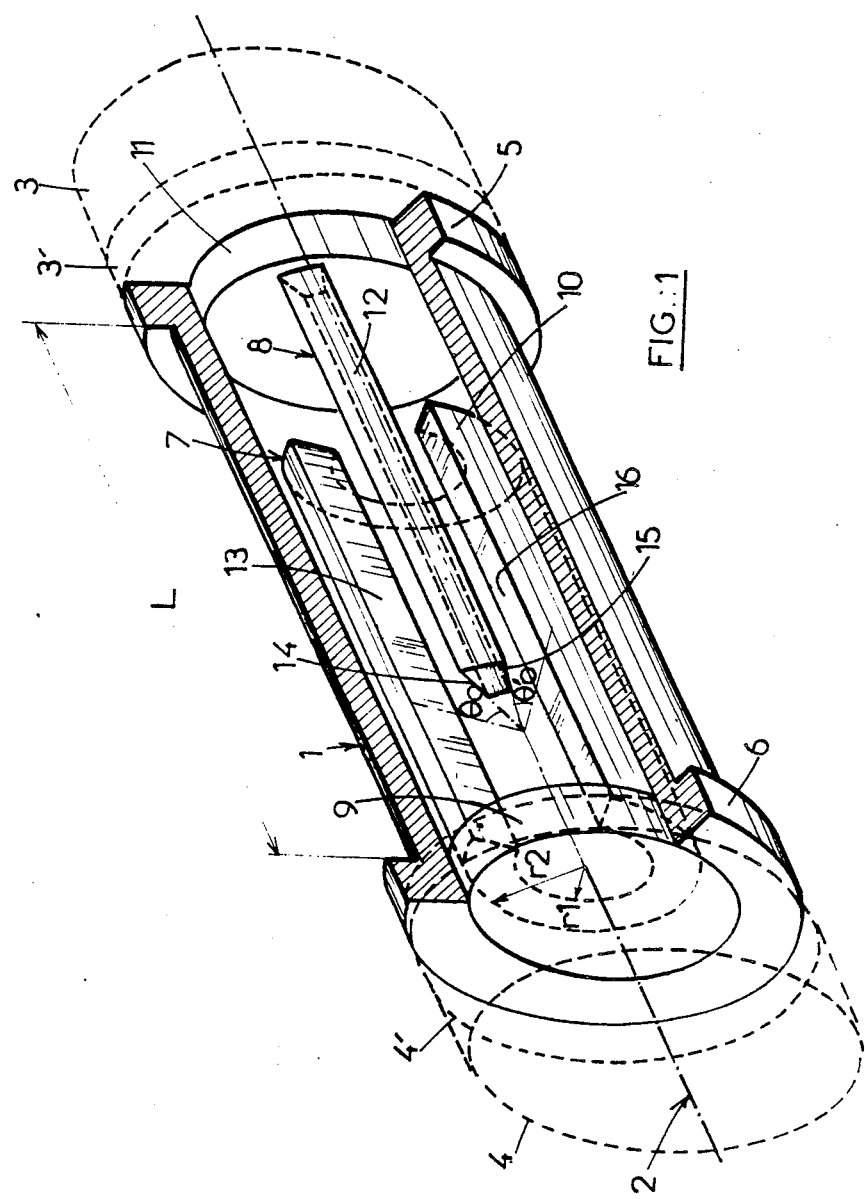
FIG. 1 shows a schematic view in perspective of a first embodiment of a capacitive sensor according to the present invention.

FIG. 1 shows a sensor according to the invention which has a sleeve 1 with a cylindrical shape generated by revolution and an axis 2. The sleeve 1 is a section of an engine shaft having two other sections, 3 and 4, which are coaxial and aligned on the axis 2. The two ends of the sleeve 1 form the fixing bases. The sections 3 and 4 are respectively fixed to opposite bases 5 and 6 of the sleeve by coupling means shown schematically at 3', 4' respectively. Each of the two bases of the sleeve is buttressed by a shoulder which increases the rigidity of the sleeve at its bases so that the stiffness, under torsion, of these shoulders is far greater than that of the sleeve between its bases. Thus, the bases of the sleeve are practically incapable of being deformed.

In FIG. 1 a partial cutaway shows that part of the sensor which is inside the sleeve 1. In the cylindrical volume inside this sleeve, there are two electrode supporting elements 7 and 8. The supporting element 7 is formed by a circular base plate 9, transversal to the axis 2 and solidly joined to the sleeve at the base 6. This plate 9 supports a cylindrical shell 10, with a shape generated by revolution, coaxial to the sleeve. This cylindrical shell has an internal radius r1 and an external radius r2. The latter is itself smaller than the radius of the internal cylindrical volume of the sleeve, so that the shell remains at a distance from the internal wall of the sleeve. The length of the cylindrical shell, parallel to the axis 2, is itself smaller than the length L between the two bases of the sleeve, so that the end of this shell, which is close to the other base 5 of the sleeve, is axially at a distance from this base.

The shell 10 is axially split along two planes forming an angle, the tip of which goes through the axis 2. This slit demarcates a space for a second supporting element having a circular plate 11 transversal to the axis 2 and fixed to the sleeve at its base 5. An axial part 12 goes beyond this plate 11 so as to go through the slit of the shell 10 of the other supporting element 7. The part 12 has two axial faces in planes going through the axis 2. The angle of these two planes is smaller than that of the slit of the shell 10. The part 12 is also demarcated by two other cylindrical surfaces with an axis 2, respectively having an internal radius r1 and an external radius r2 which are equal to those of the shell 10. The axial length of the part 12 is smaller than the length L of the sleeve, as is the case with the axial length of the shell 10. Thus, the unoccupied end of the part 12 is at a distance from the circular plate 9 which forms the base of the shell 10, just as the unoccupied end of this shell 10 is at a distance from the circular plate 11 which forms the base of the part 12.

When an engine torque is applied to the shaft section 3, this torque is transmitted by this sleeve 1 to the shaft section 4. The external diameter of the sleeve is such that the sensor is integrated into the line of shafts that transmits the engine torque. The sleeve is designed to have a smaller cross-section than that of the shafts 3 and 4 transmitting the engine torque. Furthermore, the material forming this sleeve 1 is chosen so that, under the influence of the engine torque transmitted from the shaft 3 to the shaft 4, it undergoes a significant torsion around the axis 2, even while its bases 5 and 6 undergo no deformation during the transmission of this engine torque, through the thickening of the sleeve at its bases, due to the shoulders formed on them. The torsional moment applied to the sleeve causes a rotation, identified by an angle, of the two supporting elements with respect to one another.

The slit of the shell 10 is demarcated by two radial surfaces 13 and 16 while, before these faces 13 and 16, the part 12 has faces 14 and 15 respectively. When the torsion of the sleeve 1, under the effect of the engine torque transmitted, causes a relative shift of the supporting elements 7 and 8, the angular deviations between the faces 13 and 14 on the one hand and 15 and 16 on the other hand vary and the variations are in reverse directions. To detect these variations and thereby sense the torsion angle to which the sleeve has been subjected under the effect of the engine torque, to finally achieve a measurement of this torque, rectangular electrodes are placed on the faces 13, 14, 15 and 16 so as to form two capacitors: one capacitor with a value C1 and one capacitor with a value C2, respectively formed by the electrodes placed on the faces 13 and 14 and on the faces 15 and 16. The capacitance of a capacitor varies with the spacing of the electrodes that form it. The variations in the capacitances C1 and C2 of the capacitors thus make it possible to determine the torsion angle of the sleeve and, thereby, determine the torque transmitted by this sleeve.

The capacitances C1 and C2 of the two capacitors thus formed are related to the angle of the torsion undergone by the sleeve by the relationships:

$$\frac{C2 - C1}{C2 + C1} = \frac{\theta_0 - \theta_0'}{\theta_0 + \theta_0'} + \frac{2\alpha}{\theta_0 + \theta_0'} = a + b\alpha$$

a and b being constants, $\theta$. and $\theta'$. being the angular deviations of the electrodes of the first and second capacitors C1 and C2 respectively when there is no torsional moment.

Having measured $\alpha$ by means of this relationship, it is possible to determine the torque M transmitted by the relationship:

$$\alpha = \frac{ML}{GI_0}$$

where:

$$G = \frac{E}{2(1 + \mu)}$$

E equals Young's modulus of the material forming the sleeve,
$\mu$ = Poisson's ratio of the material forming the sleeve;
Io = the moment of polar inertia of that part of the sleeve between its bases;
$\alpha$ = torsion angle of the sleeve between its bases, and the ratio:

$$\frac{C2 - C1}{C2 + C1}$$

is a linear function of the torsion angle $\alpha$ and, consequently, of the transmitted torque. A measurement of the ratio C2/C1 of the capacitances enables a computation of:

$$\frac{C2 - C1}{C2 + C1}$$

In effect:

$$\frac{C2 - C1}{C2 + C1} = \frac{C2/C1 - 1}{C2/C1 + 1}$$

Thermal drifts, if any, of C1 and C2, inasmuch as the two capacitors are formed identically, are thus eliminated.

In FIGS. 1 to 3, identical or similar units or elements are designated by the same references. FIGS. 2 and 3 correspond to an electrical embodiment comprising a sensor according to the invention very similar to the sensor according to FIG. 1 which comprises, in particular, two capacitors with respective capacitances C1 and C2. An electrode of each of the two capacitors, with capacitances C1, C2, is connected to the mechanical ground of the sensor. The supporting elements of these electrodes and the sleeve 1 are metallic, and hence conductive, and form a first common electrode of each of the capacitors having capacitances C1 and C2. The second electrode of each of the capacitors, having capacitances C1 and C2, is therefore electrically insulated from the mechanical ground. These second electrodes are both arranged on one of the two supporting elements 7, 8, so as to simplify the making of the electrical connection with an electronic measuring device. The second electrode of the capacitor with a value C1 is placed on the face 13 of the shell 10, and the second electrode of the capacitor with a value C2 is placed on the face 16 of this same shell. There is thus access, on the same supporting element 7, to all the electrodes insulated from the capacitors with values C1 and C2.

In FIG. 2, broken lines demarcate the surfaces occupied by the insulated electrodes 20 and 21 on the faces 13 and 16 of the shell 10 of the supporting element 7. The FIG. 3A and 3B respectively represent sectional and elevation views of the electrode 20 fixed to the face 13 of the shell 10 of the supporting element 7.

In these figures, it is seen that the electrode 20 has a plate 22 fixed by screws 23 and 24 and spring washers 25 and 26 to the face 13 of the shell 10. The spring washers 25 and 26 are designed to absorb expansion differences among the materials. Other means for fixing, bonding, brazing etc. could be used to fix this plate to the face 13 of the shell 10 inasmuch as they are compatible with the materials forming the plate and the shell. The plate 22 is made of an electrically insulating material consisting of a ceramic, for example. On the face of the plate 22 which is not in contact with the face 13 of the shell, the following are deposited successively by a silk-screen printing method:

- a first conductive layer 27 which covers the major part of the insulating plate, leaving free the spaces needed for its fixing. This conductive layer 27 fulfills a dual function of being a guard ring and a screen as shall be seen further below;
- a second insulating layer 28 covering almost the entire layer 27, leaving free only one zone of this layer designed to provide for its electrical connection to an electronic measuring device;
- a third conductive layer 29 deposited on the layer 28. This third layer forms the second electrode of the capacitor having a value C1. The contour of this layer is entirely inside the contour of the insulating layer 28, and this layer is thus completely insulated from the first conducting layer 27. Furthermore, the contour of the layer 29 is also entirely within the contour of the first layer 27.

The second electrode 29 of the capacitor C1 thus has no capacitance with the mechanical ground except through the face 14 of the part 12, without having any capacitance with the face 13 of the shell 10, because of the shielding role played by the conductive layer 27. Furthermore, since the periphery of this layer entirely surrounds the second electrode of the capacitor having a value C1, this second electrode is well shielded by a guard ring.

The second electrode of the capacitor C2 is made in the same way. The layer 29 forming the second electrode of the capacitor C1 is electrically connected to an electronic measuring device by means of the core 30 of a shielded conductor, the shielding of which is connected to the layer 29 forming the guard ring. The shielding of the shielded conductor 30, 31, is insulated from the mechanical ground. The contacts are provided by means of conductive bonders or by any other suitable means such as a solder. Holes are made in the plate 9 forming the base of the supporting element 7 for the passage of the shielded conductor.

The sensor is designed to detect a torsion angle due to a torque applied to its sleeve. It works as a transducer and powers an electronic instrument which performs a measurement of the torsional moment with electrical signals modulated by the variations of the capacitances of the capacitors of the sensor.

The torque measuring instrument associated with the sensor according to the invention shall be described with reference to FIGS. 2 and 4. This instrument essentially has an electronic signal-processing device incorporating electronic means sensitive to the capacitances of the capacitors of the sensor, to give a signal representing the torque transmitted by the sleeve of the sensor using signals given by these electronic means.

FIG. 2 shows that the plate 9 of the supporting element 7 supports, through a small column 32, an electronic plate 33 fixed to this small column by a screw 34. The plate supports the components of the electronic processing device which is connected to the capacitors having capacitances C1 and C2 by shielded cable 30, 31 and 30', 31' respectively and to the mechanical ground of the sensor. It is thus seen that, through the sleeve 1 which completely surrounds the internal components of the sensor, the sensor fulfills a triple function of protecting these elements, transmitting an engine torque and detecting a torsion angle of the sleeve and, hence, a torque.

The circuit mounted on the plate 33 may give a signal representing the torque supported by the sensor or a signal needed to prepare such a signal, outside the sensor and by other electronic devices. In all cases, the electrical signal prepared on the plate has to be brought out of the sensor. Since the sensor rotates with the engine shaft, it proves to be advantageous, when the shaft rotates at high speed, to have electromagnetic interface means, in which no mechanical friction develops, in order to transfer this signal.

As shown in FIG. 2, a coupling by a rotating transformer 35, 36, may be used to transfer the signal outside the sensor. In this case, the transformer has a rotor 35 fixed to the rotating sleeve 1 and a stator 36 fixed with respect to the frame and surrounding the rotor. The output of the circuit implanted in the plate 33 is connected to the coil 37 of the rotor by lead-out conductors 38, 39. The signal induced in the coil 40 of this stator supplies an external operating device (not shown) through lead-out conductors 41, 42 connected to this coil.

The rotating transformer 35, 36, fulfills a dual function:
a function of transmitting an electrical supply to the electronic plate. To do so, the stator 36 is supplied, through the conductors 41, 42, with an AC voltage source forming the primary coil of the transformer. The rotor 35 gives an AC voltage to the circuit mounted on the plate 33, through conductors 38 and 39. The electronic plate supports, firstly, rectifier, filtering and regulation circuits giving the DC voltages needed for the working of the measuring circuits and, secondly, the measuring circuits proper which shall be described hereinafter;

a function of transmitting the output signal towards the outside of the rotating transformer by means of the coils 37 and 40, the coil 37 then playing the role of a primary coil and the coil 40 playing the role of a secondary coil. The circuits are adjusted so that the alternating output signal has a frequency which is sufficiently distinct from the frequency of the supply voltage of the transformer, so that appropriate filtering circuits enable these frequencies to be restored separately.

As an alternative, the electrical supply of the electronic plate may be provided by an alternator consisting of a fixed passive stator and a rotor mounted on the engine shaft to rotate with it.

Hereinafter, we shall describe an embodiment of an electronic processing device associated with the sensor to enable the formation of a signal representing a measurement of the torque to which the sleeve of this sensor is subjected.

Various stray capacitances are liable to effect the measurement of the values of the capacitors, having capacitances C1 and C2, of the sensor. For each insulated electrode, there is a stray capacitance between the guard ring of the layer 27 and the second electrode of the capacitor. There is also another stray capacitance between the guard ring described above and the mechanical ground of the sensor. The measuring method implemented in the measuring instrument according to the invention should be such that the result of the measurement is independent of the values of these stray capacitances. Furthermore, the measuring circuits should not have capacitances in parallel on the capacitances C1 and/or C2 of the sensor, to prevent the measurements from being falsified.

FIG. 4 shows an electronic processing device comprising an oscillator 50 with two terminals 51, 52, between which a capacitor can be connected. The oscillator has its oscillation frequency F which is inversely proportionate to the value C of the capacitor connected between the terminals 51, 52, that is:

$$F = \frac{K}{C}$$

K being a coefficient independent of C.

There are oscillators, available in the market, which can be used in the present invention. These oscillators generally comprise an integrating amplifier and a Schmitt trigger made with operational amplifiers or CMOS circuit. These oscillators can be used with the capacitors, having capacitances C1, C2, of the capacitive sensor and are immunized against the effects of the stray capacitances mentioned above.

In the processing device of FIG. 4, the point common to the capacitors having capacitances C1 and C2 is connected to the terminal 51 of the oscillator 50. An analog switch 53 sequentially connects the second electrodes of the capacitors having capacitances C1, C2 to the terminal 52 of the oscillator 50. A logic control circuit 54 receives the pulses given by the oscillator 50 and forms an output signal s and a control signal t to control the analog change-over switch 53. Depending on the state of the control signal t, the switch 53 connects the terminal 52 of the oscillator 50 either to the second electrode of the capacitor with a value C1 or to the second electrode of the capacitor with a value C2. The oscillator then gives a frequency F1 or F2 signal depending on whether it is connected to the capacitor with a value C1 or to the capacitor with a value C2, these frequencies F1 or F2 being given by the following expressions:

$$F1 = \frac{K}{C1} \quad F2 = \frac{K}{C2}$$

In its simplest version, the control circuit 54 has a counter, the input of which receives the signal coming from the oscillator, and one of its outputs (Qn) of which changes its state every $2^n$ pulses of the input signal. The output signal s and control signal t are then both connected to $Q_n$. The rectangular signal t is a logic signal which is at the top level during a period $t_1$ corresponding to the time during which the capacitor with a value C1 is connected to the oscillator which then gives a signal at a frequency F1. The period $t_1$ counts $2^b$ pulses of F1 which gives, for $t_1$, the following expression:

$$t_1 = \frac{2^n}{F1}$$

Similarly, the signal t is at a bottom level during a period $t_2$ with the form:

In view of the expressions of F1 and F2 given above, it would appear that:

$$\frac{t_2}{t_1} = \frac{C2}{C1}$$

Thus the measurement of the cyclical ratio of the signal t enables the ratio C2/C1 to be achieved. This ratio, as was seen earlier, can be used to simply measure the torsion angle of the sleeve of the capacitive sensor by a linear relationship of the form:

$$\frac{C2/C1 - 1}{C2/C1 + 1} = a + b\alpha$$

The torsion angle $\alpha$ being itself directly proportionate to the torque, applied to the engine shaft, which is to be measured.

The precision of the measurements may be improved by providing for means to inhibit the counting of the first pulse given by the oscillator after each flip-over of the signal t.

The device is independent of the drifts of the oscillator (long term drifts or thermal drifts of the coefficient K).

The control logic circuit 54 may further comprise digital circuits for the measurement of the periods $t_1$ and $t_2$ (using an internal clock and counters for example) and computation elements enabling the formation, with the measured periods $t_1$ and $t_2$, of an output signal s representing the torque applied to the monitored shaft.

Of course, the invention is not restricted to the embodiments of the capacitive coupler and the measuring instrument that have been described or represented above. For example, a device other than a rotating transformer can be used to fulfill the functions of supply and of transmission, outside the sensor, of the output signal. In particular, these functions can be fulfilled by a device with two antennas, one fixed and the other rotating, designed to transmit radio-electrical signals.

In applications where the rotation speed of the shaft is small enough for problems of friction to cause no hindrance to an approach of this type, it is also possible to achieve this dual function by means of slip rings and brushes rubbing against these rings.

Other variants of the capacitive sensors shown in FIGS. 1 and 2 are possible, from the viewpoint of the mechanical structure of the supporting elements of the electrodes of the capacitors. For, as shown in these figures, the supporting elements 7 and 8 are not balanced and each introduce an unbalance in the hollow sleeve. This may be bothersome for systems rotating at high speed. This problem can be easily resolved by designing the supporting elements so that the center of gravity of each of them is on the axis of the sensor. For example, these tube-shaped supporting elements each have two equal longitudinal slits, symmetrical with respect to the axis or, again, three equal longitudinal apertures staggered by 120 degrees etc. These geometrical variants further make it possible to increase the pairs of capacitors having capacitances C1, C2. It then suffices to wire all the capacitors of a value C1, varying in the same direction, in parallel, and all the capacitors of a value C2, varying in the other direction, in parallel. The structure thus has only two capacitors varying in opposite directions.

The above-described capacitors having capacitances C1 and C2 have a common electrical point, identical with the mechanical ground. In certain applications, the two electrodes of each of the capacitors having capacitances C1, C2 may be insulated from the mechanical ground. The method for making the above-described two electrodes with values C1 and C2, using insulating plates attached to the mechanical structure can be applied to all the electrodes and thus gives conductors that are totally insulated from the mechanical ground of the sensor. The method for making the second electrodes C1 and C2 described above is not the only one possible. Other manufacturing technologies may be used such as, for example:

thin layer deposition of alternately insulating and conducting thin layers, with photo-etching, if necessary, these deposits being done directly on the faces 13 and 16;

the bonding of a flexible or rigid printed circuit to the mechanical structure, etc.

The result of the above is that the capacitive detector according to the invention enables the measurement of a torsion angle under the effect of an applied torque. The measurement of the torque is deduced therefrom with high precision in a wide range of temperature if the torsion constant of the sleeve is independent of this temperature. In this respect, it is worthwhile make the sleeve using a material such as DURINVAL, manufactured by the firm IMPHY, or any other equivalent material.

All the value of the capacitive detector is seen in the measurement of small torsion angles (measurement range of the order of 0.1 degrees to 1 degree) thus enabling work with the small inter-electrode distances and, hence, capacitance values which can be exploited by electronic means. It enables the making of a torque measuring apparatus or torque meter which is sensitive and compact, where small torsion angles correspond to small sleeve lengths. Owing to this compactness, and by its rotational character, the sensor according to the invention is particularly well suited to the measurement of the torque transmitted by the shaft of the engine of a helicopter.

The capacitive detector of the invention makes it possible to have high relative variations for the capacitors having capacitances C1 and C2. For example, for a maximum torsion angle $\alpha = 0.5°$, it is possible to take an angular inter-electrode distance of 1° for C1 and C2 when there is no applied torque. In this way, the ratio C1/C2 of the capacitances varies from 1 to 3 between zero torque and the maximum torque.

The capacitive sensor according to the invention can find other applications, notably in the measurement of angular positions (for small angles) or the detection of zero in a servo-controlled system.

What is claimed is:

1. A torsion angle capacitive sensor for the measurement of a torque transmitted by an engine shaft having an axis, which comprises a sleeve which forms a section of the engine shaft and has two ends and two pairs of electrodes, the two electrodes of each of the two pairs of electrodes being respectively solidly joined to the two ends of the sleeve and extending in parallel to the axis of the engine to form two capacitors, the respective capacitances of the two capacitors varying inversely when a torsional moment or torque is applied between the ends of the sleeve, electronic means connected to the two capacitors and sensitive to the capacitance of each of the two capacitors, electromagnetic interface means having a first part that is solidly joined to the sleeve and a second part that is solidly joined to a frame in which there rotates the engine shaft to transmit the signal to an external device exploiting the sensor, and a first supporting element shaped like a cylindrical shell, coaxial with the sleeve and solidly joined to one end of the two ends of the sleeve, and shell having an axial slit, the edges of which define two of the electrodes, a second supporting element solidly joined to another end of the two ends of the sleeve and bearing two of the other electrodes each extending in this sleeve facing one of the electrodes defined on the cylindrical shell to form the capacitors.

2. A sensor according to claim 1, wherein the capacitors are arranged cylindrically with respect to the axis of the sensor so as to provide for the mechanical balancing of the sensor on this axis.

3. A sensor according to claim 1, wherein an electrode of each capacitor is connected to a mechanical ground.

4. A sensor according to claim 1, wherein at least one electrode of each capacitor is insulated from a mechanical ground.

5. A sensor according to claim 4, wherein an electrode insulated from the mechanical ground is formed by a electricity conducting layer, deposited on an insulating layer going beyond the limits of the conductive layer, the insulating layer being itself deposited on a second conductive layer formed on an insulating plate fixed to one of the supporting elements made of an electricity conducting material, the three layers forming an insulating capacitance for the electrode.

6. A sensor according to claim 5, wherein the second conductive layer goes beyond the limits of the insulating layer to define a shield countering the effects of the edges.

7. A sensor according to claim 1, wherein the electrodes extend in planes going through the axis of the sensor.

8. A sensor according to claim 1, wherein the electronic means are mounted on a plate fixed to a supporting element inside the sleeve.

9. A sensor according to claim 1, wherein the electromagnetic interface means have a moveable antenna solidly joined to the sleeve and a fixed antenna coupled to the movable antenna, outside the sleeve.

* * * * *